Jan. 10, 1933.            M. H. JOHANSON            1,893,943
                TOOL MECHANISM FOR GEAR CUTTING MACHINES
                         Filed Oct. 29, 1931

INVENTOR
Magnus H. Johanson
BY
his ATTORNEY

Patented Jan. 10, 1933

1,893,943

UNITED STATES PATENT OFFICE

MAGNUS H. JOHANSON, OF ROCHESTER, NEW YORK, ASSIGNOR TO GLEASON WORKS, OF ROCHESTER, NEW YORK, A CORPORATION OF NEW YORK

TOOL MECHANISM FOR GEAR CUTTING MACHINES

Application filed October 29, 1931. Serial No. 571,335.

The present invention relates to tool mechanisms for gear cutting machines and more particularly to mechanisms for positively moving a reciprocating tool to and from cutting position at opposite ends of its stroke.

In the ordinary positively-actuated tool clapping mechanism, the clapping movement, that is, the movement of the tool to and from cutting position is fixed. It is the same for gears of large pitch and great tooth depth as for gears of small pitch and small tooth depth. It is determined by the largest pitch of gears to be cut on the machine. Hence, when a gear of fine pitch is being cut, the clapping movement is more than necessary, a loss of time results and the gear is more expensive than it otherwise would be.

The purpose of this invention is to provide a simple, inexpensive and quickly manipulable means for changing the amount of clapping movement so that the amount of this movement can be adjusted to conform more closely to the minimum required to enable the tool to clear the blank on the tool's idle return stroke.

A preferred embodiment of the invention is illustrated in the accompanying drawing in which.

The present invention is shown as applied to a machine of the continuous indexing type such as disclosed in Patent No. 1,616,439 issued February 8, 1927 to Allan H. Candee and the present inventor and it is an improvement upon the tool mechanism disclosed in Patent No. 1,643,813 issued September 27, 1927 to the present inventor. It is to be understood, however, that the present invention has a wide field of application and may, in general, be applied to any positively-actuated tool-clapping mechanism. For the purpose of explanation, however, reference will be made to the tool-clapping mechanism of Patent No. 1,643,813 in describing the improvement of the present invention.

In the gear cutting machine of Patent No. 1,616,439, the blank has a continuous indexing motion and the tool is reciprocated in time with the blank rotation so that the tool cuts in a different tooth space of the blank on each stroke. The tool cuts on its stroke in one direction and is clapped out of engagement with the blank on its return stroke.

Figure 1:
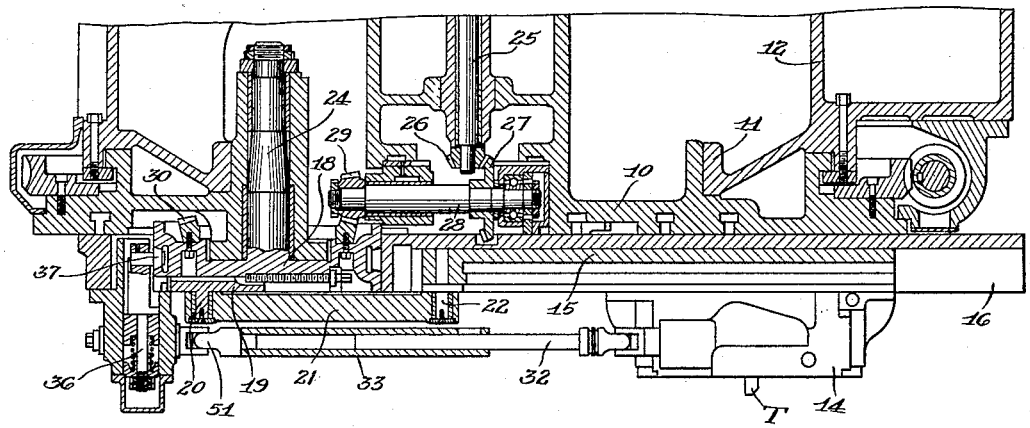
Figure 1 is a partial sectional view of a gear cutting machine provided with a tool mechanism constructed according to the present invention.
Figure 2:
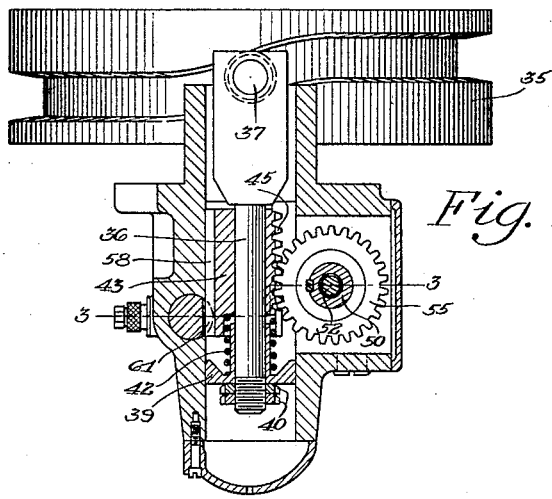
Figure 2 is a view on an enlarged scale of the improved means for controlling the clapping movement of the tool, being a view taken substantially along the line 2—2 of Figure 3.

In Figure 1, a fragmentary sectional view of a machine built according to Patent No. 1,616,439 and provided with the tool mechanism of Patent No. 1,643,813 as modified and improved by the present invention is shown. 10 designates the cradle of the machine, journaled for rotation in the bearing 11 formed in the frame 12. The tool T is mounted upon a clapper block 14 which is swingable to and from cutting position. The clapper block is carried on the tool slide 15 which reciprocates in guides formed in the tool arm 16.

The tool slide 15 is reciprocated as described in the two patents mentioned, being driven from the crank-plate 18 through an adjustable block 19, the crank pin 20 carried by the block, and the connecting rod 21 which is connected at one end to the crank pin 20 and at its other end through a pin 22 with the slide 15. The crank plate is secured to a stub-shaft 24 that is journaled in the cradle and may be driven, as described in the patents mentioned, from the shaft 25 through the bevel gears 26—27, the shaft 28 and the bevel gearing 29—30.

The mechanism immediately operable to swing the clapper-block to and from cutting position at opposite ends of the stroke of the tool slide may be identical with that shown in Patent No. 1,643,813. It may be operated as described in that patent by oscillation of the shaft 32 which has a telescoping connection with the shaft 33. So far as described, the tool slide reciprocating and the tool-clapping mechanism are the same as described in the patents mentioned and reference may be had to those patents for a more detailed description thereof. So far as the tool-clapping mechanism is concerned, it is sufficient to state that when the shaft 32 is oscillated, the tool is moved toward or from cutting position depending upon the direction of movement of the shaft 32.

The shaft 32 is oscillated from a cam 35 which may be identical with the cam shown in patents mentioned and cut into the periphery of the crank plate 18 so that the reciprocating and clapping motions of the tool will be absolutely timed together. As the cam 35 rotates, it will reciprocate a rod 36 that carries a roller 37 which engages in the slot of the cam 35.

39 designates a guide member that is mounted upon the rod 36 and held thereon by the nuts 40. The rod 36 has a flexible connection by means of the spring 42 with a sleeve 43 that is mounted on the rod. The spring connection causes the sleeve 43 to be reciprocated with the rod 36 but allows of any shock to be absorbed without damaging the mechanism.

The sleeve 43 has two sets of rack-teeth 45 and 46 formed thereon. These sets of rack-teeth extend in the direction of movement of the rod 36 and are preferably of the same pitch and length, but at different distances from the center of the rod 36. Thus, the rack 45 is nearer the center of the rod 36 than the rack 46.

50 designates a hollow shaft that is connected by the universal joint 51 and bolt 52 to the shaft 33. The shaft 50 is held in the bearing 51 by means of the nut 53.

There are two spur gears 55 and 56 mounted on the shaft 50 and keyed thereto. These gears are of the same pitch, but of different diameters and tooth numbers. The gear 55 is intended to mesh with the rack 45 while the gear 56 is intended to mesh with the rack 46. The two racks 45 and 46 are spaced angularly far enough apart on the periphery of the sleeve 43 so that only one rack can be in engagement with its gear at a time.

The sleeve 43 is rotatably adjustable upon the rod 36 to bring the racks 45 and 46 selectively into engagement with their respective mating gears 55 and 56. To this end, the sleeve 43 has cut into its periphery a spur gear segment 58. This lies on the opposite side of the sleeve from the racks 45 and 46. The teeth of this segment extend for the full length of the sleeve and lie at right angles to the teeth of the racks 45 and 46.

60 designates a bar that is formed on one side with rack teeth 61 which mesh with the teeth of the segment 58. 62 designates a pin that is threadable into an opening 67 in the bar 60, and 63 designates a sleeve that is mounted on this pin 62 and held thereon by the nut 64. The pin 62 and sleeve 63 are adapted to be passed through one or the other of two openings 65 in the casing 66 that contains the part of the clapper-actuating mechanism so far described. This casing is secured to the face of the cradle 10 by screws 68.

When the pin 62 and sleeve 64 are in the position shown in the drawings, the bar 60 is locked against movement and the rack 45 of the sleeve 43 is held in engagement with the gear 55. By loosening the nut 64 and withdrawing the pin 62 and sleeve 63 from the bar and moving the bar to the right, the sleeve 43 can be rotated on the rod 36 to disengage the rack 45 from the gear 55 and bring the rack 46 into engagement with the gear 56. The sleeve 43 can be locked in this latter position then by passing the pin 62 and sleeve 63 through the right-hand opening 65 shown in Figure 3 and re-threading the pin into its recess in the bar 60.

The stroke of the rod 36 under actuation of the cam 35 is constant and invariable. During the cutting stroke of the tool slide 15, the roller 37 travels in a dwell in the trackway of the cam 35 but at the end of the cutting stroke of the slide, the rod 36 is moved in one direction to cause the tool T to be swung from cutting position. During the return stroke of the tool slide, the roller 37 again travels in a dwell in the cam 35, the tool being held out of cutting position. At the end of the return stroke, the rod 36 is returned to original position, returning the tool T to cutting position ready for the next cutting stroke.

Figure 3:
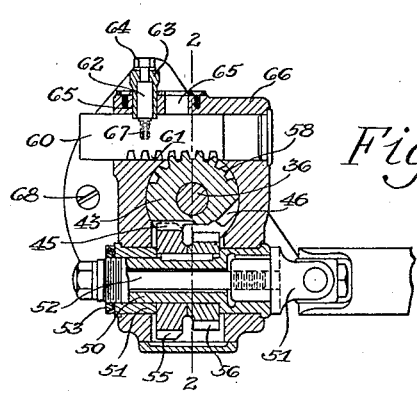
Figure 3 is a section on the line 3—3 of Figure 2.

When a gear of comparatively fine pitch is to be cut, the bar 60 and the sleeve 43 will be held in the position shown in Figure 3 with the rack 45 in engagement with the gear 55. Thus as the rod 36 is reciprocated, it will impart to the sleeve 43 a corresponding movement through the intermediation of the spring 42. This will cause the rack 45 to rotate the gear 55 and shaft 50 and through the universal joint connection 51, the shafts 33 and 32. Thus the tool T will be swung to or from cutting position depending upon the direction of movement of the rod 36, and the angle of its swinging movement will be determined by the length of stroke of the rod 36 and the ratio of teeth in the rack 45 and gear 55.

When it is desired to cut a gear of a relatively coarse pitch and relatively great tooth depth, the pin 62 will be dis-engaged from the recess 67 in the bar 60, and the sleeve 63 from that opening 65 in the casing 66 in which it has been engaged and the bar 60 will be moved by the operator of the machine to the right from the position shown in Figure 3. This will cause the sleeve 43 to be rotated on the rod 36 because of the meshing engagement between the rack 61 carried by the bar 60 and the segment 58 cut into the sleeve 43. Thus the rack 45 will be moved out of engagement with the gear 55 and the rack 46 moved into engagement with the gear 56.

The operator will then lock the parts in the new position by threading the pin 62 into the recess 67 of the bar 60 and inserting the sleeve 63 into the other opening 65 in the casing 66. Now when the rod 36 is reciprocated by the cam 35, the amount of movement imparted to the shaft 32 will depend upon the ratio of tooth numbers of the rack 46 and gear 56 and since the gear 56 is smaller than the gear 55, the tooth will be moved a greater distance in its clapping motion.

Thus with the present invention, a very simple means has been provided whereby an invariable stroke of a rod 36 can be used to impart at will different amounts of movement to the tool clapping mechanism. It is not necessary to substitute cams, all the operator has to do is to pull out a pin and a sleeve and shift the bar 60 and the amount of throw of the clapper block is changed. The shifting of the bar should be done when the tool is at one or other of its limit positions so as to be sure that the racks 45 and 46 can be easily meshed or disengaged, as the case may be, with their respective mating gears.

While the invention has been described in connection with a particular embodiment, it will be understood that it is capable of various further modifications and this application in general, is intended to cover any adaptations, uses, or embodiments of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a gear cutting machine, a reciprocable tool slide, a movable tool support mounted on said slide and operable to move the tool to and from cutting position, respectively, at opposite ends of the movement of said slide, means for reciprocating said slide, and means for actuating said support comprising a reciprocable member having a stroke of invariable length, and separate means connected to the tool support and selectively connectable to said reciprocable member adapted to impart, respectively, when connected to the reciprocable member, different amounts of movement to said tool support.

2. In a gear cutting machine, a reciprocable tool slide, a movable tool support mounted on said slide and operable to move the tool to and from cutting position at opposite ends of the movement of the slide, and means for actuating said support comprising a reciprocable rod provided on its periphery with two sets of rack teeth which extend in the direction of said rod, means for reciprocating said rod through a fixed distance, a shaft having two spur gears secured thereto and adapted to mesh, respectively, with the two racks, the ratios of the tooth numbers of the two sets of racks and gears being different, and said rod being rotatably adjustable whereby one or other of said racks may be selectively engaged with its mating gear to impart, respectively, different amounts of movement to the tool support.

3. In a gear cutting machine, a reciprocable tool slide, a movable tool support mounted on said slide and operable to move the tool to and from cutting position, respectively, at opposite ends of the movement of the slide, and means for actuating said support comprising a reciprocable rod having a pair of racks secured thereto, a shaft connected to the tool support to move the same when rotated, a pair of gears secured to said shaft and having different numbers of teeth, and means for rotatably adjusting said rod to bring the different sets of rack teeth respectively into engagement with the two gears, said last named means comprising a reciprocable bar and gearing connecting the bar with said rod, and means for securing said bar against movement when the rod has been rotated into either position of its adjustment.

MAGNUS H. JOHANSON.